Figure 1:
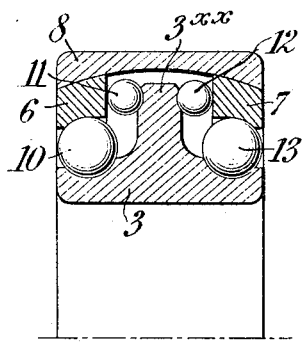

S. G. WINGQUIST.
BALL BEARING.
APPLICATION FILED SEPT. 17, 1914.

1,166,799.

Patented Jan. 4, 1916.

WITNESSES:

INVENTOR
Sven Gustaf Wingquist
By Attorneys,

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BALL-BEARING.

1,166,799.  Specification of Letters Patent.  Patented Jan. 4, 1916.

Original application filed March 18, 1911, Serial No. 615,339. Divided and this application filed September 17, 1914. Serial No. 862,181.

*To all whom it may concern:*

Be it known that I, SVEN GUSTAF WINGQUIST, a subject of the King of Sweden, residing at Gottenborg, in the Kingdom of Sweden, have invented certain new and useful Improvements in Ball-Bearings, of which the following is a specification.

This invention relates to a ball bearing so arranged that its inner parts, consisting of the balls and of rings, around which the balls run, can be mounted into the outer part, which also is ring shaped and made integral, and removed from the same without any screws or parts fixed by screwthreads being first detached.

One object of the invention is to provide a self-adjustable and self-contained ball bearing simple in construction and economical to manufacture and serviceable in use, and which will take up both radial and axial thrust.

In the drawings accompanying this specification the invention is practically illustrated, wherein—

Figure 2:
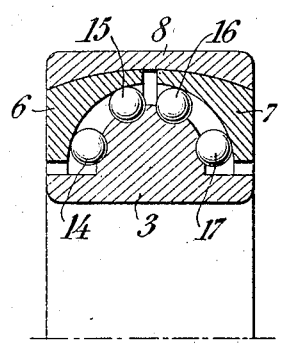
Figure 3:
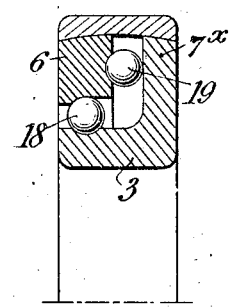
Figure 4:
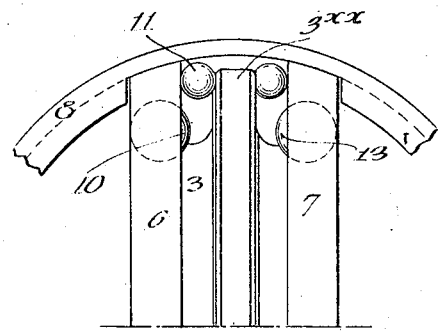

Figure 1 is an axial section of a bearing constructed according to the present improvements; Fig. 2 is a similar view of another form of the device; Fig. 3 is a similar view wherein a single set of balls is provided for receiving the axial thrust, and a single set for sustaining the radial load; and Fig. 4 is a detail illustrating the assembling and disassembling of the parts.

In bearings which are subjected to great strain, more than two sets of balls may be used for sustaining the load, preferably four sets, so arranged that two sets are subjected substantially to the radial pressure and the other two sets . .bstantially to the opposite axial pressure. Such a bearing is shown in Fig. 1. Four sets of balls 10, 11, 12, 13 are located one behind the other longitudinally of the shaft or bearing. The main bearing member comprises a ring 3. Two sets of balls are located at each side of the ring 3, which is provided with grooves for the sets respectively. The outer ball sets 10 and 13 run on inner track faces or rings 6 and 7, which rings are contained in an outer sleeve 8. The shaft is passed through the ring 3 and is supported by the same longitudinally. The outer surfaces of the rings 6, 7, bearing against the inner side of the sleeve 8, form parts of a sphere the center point of which is located on the axis of the bearing and within the bearing. The inner surface of the sleeve 8 is also spherical, so that the inner parts as a whole can oscillate sidewise in the sleeve, thus rendering the bearing self-adjusting and permitting the inner parts to be easily mounted into the sleeve and removed from the same without deforming any part of the bearing, the sleeve being shown provided with recesses for permitting such removal when the rings 6 and 7 are placed at substantially right angles to the sleeve. The ball sets 10 and 13 bear the radial load of the shaft. The two inner ball sets 11 and 12 are subjected substantially to the opposite axial pressures. For that purpose the inner ring 3 is provided on its outer side with a flange $3^{\times}$, in the opposite sides of which grooves are provided for the ball sets respectively, which besides bear against the rings 6 and 7 respectively. In this case the sides of the said rings, facing each other, form races for the balls. The balls 10 and 13 are, preferably, somewhat greater than the balls 11 and 12. Also the bearing shown in Fig. 2 has four sets of balls 14, 15, 16, 17 two sets on each side of the equatorial center plane of the ring 3. In this case, however, the rings 6 and 7 are so shaped inside, that the two central ball sets 15, 16 are subjected substantially to the radial pressure, while the outer ball sets 13, 14 are subjected substantially to the opposite axial pressures. The inner side of the rings 6 and 7 respectively, viewed in cross section, is curve shaped and incloses both the ball sets, so that the groove of the ring is common to both the sets. The said arrangement may be modified in such manner that the two ball sets run in separate grooves provided in the ring, as is the case at the ring 3 shown in Fig. 1.

In the bearing shown in Fig. 3 the inner ring also forms an outer ring, so that there are only two rings in the bearing. The inner ring is provided with an outer flange $7^{\times}$, adapted to serve as one (7) of the outer rings mentioned above. One 18 of the ball sets 18 and 19 is subjected to the radial pressure, while the other set 19, located between the ring 6 and the flange $7^{\times}$, is subjected to the axial pressure. In a bearing of this character it is particularly desirable that the outer rings 6, 7, be properly positioned one in respect of the other and both in respect of the inner bearing member 3. This in the present instance is accomplished by the spherical faces upon the outer surfaces of the rings 6, 7, engaging the inner spherical face upon the containing ring 8. This of course in connection with the proper cage of balls will assure the accurate location of the parts. The outer ring not only serves as a bearing for permitting the self-adjustment of the inner portions of the device, but also as a means for bonding the various parts together in their proper positions. The stability of the device is assured by the fact that the members 6, 7, engage the outer spherical bearing 8 at two zones which are spaced apart, and these two members 6 and 7 are so intimately connected with the other portions of the device that canting or tipping when severe duty is applied is prevented.

It will be seen that the inner bearing member 3 is provided with a portion having an outwardly directed track face for engaging balls sustaining radial load, and a portion having a laterally directed track face for engaging balls sustaining axial thrust, and that there is a set of balls on each of such faces engaging the outer member.

This application is a division of my copending application Serial No. 615,339 filed March 18, 1911, for ball bearings.

It will be readily understood that the bearings herein shown and described are illustrative of the invention, and that changes may be made within the scope of the claims without departing from the spirit of the invention.

I claim as my invention:—

1. In a ball bearing the combination of four sets of balls, an inner bearing ring for the ball sets, two of the said sets being located on each side of the equatorial center plane of the ring, two outer bearing rings forming races for each pair of ball sets, and an integral outer sleeve, inclosing the said outer bearing rings, there being spherical integral outer sleeve, inclosing the said sleeve and outer bearing rings and the sleeve being so shaped with relation to the outer bearing rings, that the latter, forming an angle with the sleeve, can be inserted into and withdrawn from the same, substantially as described and shown in the drawings.

2. In a ball bearing the combination of an inner bearing ring, four sets of balls bearing against the said ring, two of the said sets being subjected substantially to a pressure longitudinally of the shaft and bearing against outer rings respectively, and the other two ball sets subjected substantially to a radial pressure and also bearing against the said outer rings respectively, and an outer integral sleeve inclosing the said outer bearing rings, there being spherical contact surfaces provided between the outer rings and the sleeve and the latter being so shaped that the outer bearing rings located at an angle to the sleeve can be inserted into or withdrawn from the same, substantially as described and shown in the drawings.

3. In a ball bearing the combination of two ball sets, one subjected substantially to the pressure longitudinally of the shaft and the other to the radial pressure, bearing rings for the said ball sets, and an outer, integral sleeve inclosing the said outer bearing rings, there being spherical contact surfaces provided between the sleeve and the bearing rings and the sleeve being so shaped, that the outer bearing rings, located at an angle to the sleeve can be inserted onto or withdrawn from the same, substantially as described and shown in the drawings.

4. In a self-contained and self-adjusting ball bearing for receiving radial load and axial thrust, the combination with an inner member having a portion provided with an outwardly directed track face for engaging balls sustaining radial load, and a portion provided with a laterally directed track face for engaging balls sustaining axial thrust, a set of balls on each such face, and an outer member having faces for engaging each such ball set, and provided with an outer spherical face, and an integral container for said members having an inner spherical face mating with the outer spherical face thereof, the center point of such spherical faces being located on the axis of the bearing and within the bearing.

5. In a self-contained and self-adjusting ball bearing for receiving radial load and axial thrust, the combination with an inner member having portions provided with outwardly directed track faces for engaging balls sustaining radial load, and a portion provided with opposite laterally directed track faces for engaging balls sustaining axial thrust, a set of balls on each such face, and an outer member having faces for engaging each such ball set, and provided with an outer spherical face, and an integral container for said members having an inner spherical face mating with the outer spherical face thereof, the center point of such spherical faces being located on the axis of the bearing and within the bearing.

6. In a bearing, the combination with a plurality of ball sets for respectively sustaining radial load and axial thrust, members provided with faces for sustaining said balls, some of said members being provided with an outer spherical face, and an integral container provided with an inner spherical face for engaging said first mentioned spherical faces, the center point of such spherical faces being located on the axis of the bearing and within the bearing.

7. In a device of the character specified, the combination with an inner bearing member, a set of balls engaging the same for receiving radial load, a set of balls engaging the same for sustaining axial thrust, a member engaging both sets of balls and provided with an outer spherical face, and an integral member provided with an inner spherical face for engaging said outer spherical face, the center point of such spherical faces being located on the axis of the bearing and within the bearing.

In witness whereof, I have hereunto signed my name in the presence of two subscribing witnesses.

SVEN GUSTAF WINGQUIST.

Witnesses:
AUG. SÖRENSEN,
KARL RUNESKOG.